(12) United States Patent
Mathew et al.

(10) Patent No.: US 8,681,020 B2
(45) Date of Patent: Mar. 25, 2014

(54) AUTOMATED AERODROME LIGHTING CONTROL SYSTEM

(75) Inventors: Sabu Mathew, Karnataka (IN); Nithin Ambika, Karnataka (IN); Wesley Peter, Karnataka (IN); Swetha Balasa, Karnataka (IN); Shashidhara Veerabhadraiah, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 278 days.

(21) Appl. No.: 13/316,142

(22) Filed: Dec. 9, 2011

(65) Prior Publication Data

US 2013/0147641 A1    Jun. 13, 2013

(51) Int. Cl.
*G08G 5/00*    (2006.01)
*B64F 1/18*    (2006.01)

(52) U.S. Cl.
USPC ............. 340/948; 340/947; 340/953; 701/16; 434/42

(58) Field of Classification Search
USPC ......... 340/948, 947, 953, 980, 972, 642, 931, 340/933; 315/130; 244/114 R; 701/16; 434/42
See application file for complete search history.

(56) References Cited

U.S. PATENT DOCUMENTS

| | | | |
|---|---|---|---|
| 4,590,471 A * | 5/1986 | Pieroway et al. | 340/12.22 |
| 5,335,112 A | 8/1994 | Bennett et al. | |
| 5,426,429 A * | 6/1995 | Norman et al. | 340/953 |
| 5,519,618 A | 5/1996 | Kastner et al. | |
| 6,182,005 B1 | 1/2001 | Pilley et al. | |
| 6,430,480 B1 | 8/2002 | Ammar et al. | |
| 6,473,675 B2 | 10/2002 | Sample | |
| 6,573,840 B1 | 6/2003 | Norman et al. | |
| 7,088,263 B1 * | 8/2006 | Krause et al. | 340/947 |
| 7,102,540 B2 * | 9/2006 | Runyon et al. | 340/953 |
| 7,385,527 B1 | 6/2008 | Clavier et al. | |
| 2008/0137181 A1 | 6/2008 | That et al. | |
| 2009/0248224 A1 | 10/2009 | Tschannen | |
| 2011/0031896 A1 | 2/2011 | Vandevoorde et al. | |
| 2011/0106343 A1 | 5/2011 | Burgin et al. | |
| 2011/0174925 A1 | 7/2011 | Ying | |

* cited by examiner

*Primary Examiner* — Anh V La
(74) *Attorney, Agent, or Firm* — Ingrassia Fisher & Lorenz, P.C.

(57) ABSTRACT

Methods and apparatus are provided for automated control of aerodrome lighting. An exemplary system includes a communication radio, an aerodrome lighting data source, and a processor. The communication radio is configured to selectively transmit radio frequency (RF) signals. The aerodrome lighting data source is configured to at least selectively supply aerodrome lighting data representative of light control characteristics of aerodrome lighting associated with individual aerodromes. The processor is in operable communication with the aerodrome lighting data source and the communication radio, and is configured to selectively retrieve, from the aerodrome lighting data source, aerodrome lighting data associated with an individual aerodrome, and selectively command the communication radio to transmit RF signals consistent with the light control characteristics associated with the individual aerodrome.

20 Claims, 11 Drawing Sheets

AUTOMATED AERODROME LIGHTING CONTROL SYSTEM

TECHNICAL FIELD

The present invention generally relates to aerodrome lighting, and more particularly relates to a control system for automatically and controllably energizing aerodrome lighting.

BACKGROUND

Some airfields do not include a control tower or are used relatively infrequently. At such airfields, it may not be economical to keep various aerodrome lighting energized nor to provide personnel to energize and de-energize the various aerodrome lighting. As a result, a system was devised that enables pilots to controllably energize the lighting at these airfields. This system, which may be referred to as Pilot Controlled Lighting (PCL), Pilot Activated Lighting (PAL), or more generally as Aircraft Radio Control of Aerodrome Lighting (ARCAL), allows aircraft pilots to control various aerodrome lighting using the aircraft communications radio. The PCL controlled aerodrome lighting may include one or more of the approach lights, runway edge lights, and taxiway lights.

To activate PCL aerodrome lights, an aircraft pilot tunes the radio to the specific PCL frequency associated with the aerodrome of interest, and then repeatedly operates (or "keys") the radio microphone transmit switch a specific number of times within a specific time period. The specific number of clicks and the specific time period will depend upon the type of PCL system implemented at the airfield. Presently, there are two type of PCL systems—a type J system and a type K system. With type J systems, aerodrome lighting is energized by keying the radio microphone transmit switch 5 times within 5 seconds. With type K systems, aerodrome lighting is initially energized by keying the radio microphone transmit switch 7 times within 5 seconds. Thereafter, the intensity of the aerodrome lights in type K systems may be set to low, medium, or high intensity by keying the radio microphone transmit switch 3, 5, or 7 times, respectively, within 5 seconds. If runway identification lights are also controlled by a type K system, these lights may be turned off by keying the radio microphone transmit switch 3 times.

With both the type J system and the type K system, a 15-minute countdown commences upon energizing the aerodrome lighting. When the 15-minute countdown is completed, the aerodrome lighting is automatically deenergized. Whenever the aerodrome lighting is energized, each time a lighting command is issued, the 15-minute countdown is reset. At some airfields, the aerodrome lighting may flash once to warn a pilot that the aerodrome lighting will be deenergized within two minutes. It may thus be appreciated that aircraft pilots are encouraged to issue a fresh lighting command upon final approach to an PCL controlled aerodrome, even if the aerodrome lighting is energized. This ensures the aerodrome lighting is not deenergized at any point during the aircraft approach and landing phase.

The approach and landing phase of an aircraft is a relatively important phase of flight. When conducting an approach and landing, the primary focus of a pilot is preferably on such tasks as looking out for other traffic and communicating position, intent, etc. on the communication radio. However, when conducting an approach and landing at an PCL controlled aerodrome, the pilot may become focused on ensuring the aerodrome lighting gets energized and, once energized, stays energized. For example, the pilot may become focused on tuning the communication radio to the correct frequency, determining number of times to key the radio microphone transmit switch, and then keying the radio microphone switch the required number of times. Moreover, after energizing the aerodrome lighting, the pilot may issue one or more additional lighting commands to make ensure the aerodrome lighting remains energized throughout the approach and landing phase.

Hence, there is a need for a system to activate PCL controlled aerodrome lighting that does not rely on a pilot keying the radio microphone transmit switch in a defined manner and/or re-keying the radio microphone transmit switch in the same defined manner during an approach and landing phase to ensure aerodrome lighting remains energized. The present invention addresses at least these needs.

BRIEF SUMMARY

In one embodiment, an automated aerodrome lighting control system includes a communication radio, an aerodrome lighting data source, and a processor. The communication radio is configured to selectively transmit radio frequency (RF) signals. The aerodrome lighting data source is configured to at least selectively supply aerodrome lighting data representative of light control characteristics of aerodrome lighting associated with individual aerodromes. The processor is in operable communication with the aerodrome lighting data source and the communication radio. The processor is configured to selectively retrieve, from the aerodrome lighting data source, aerodrome lighting data associated with an individual aerodrome. The processor is additionally configured to selectively command the communication radio to transmit RF signals consistent with the light control characteristics associated with the individual aerodrome.

Other desirable features and characteristics of the automated aerodrome lighting control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
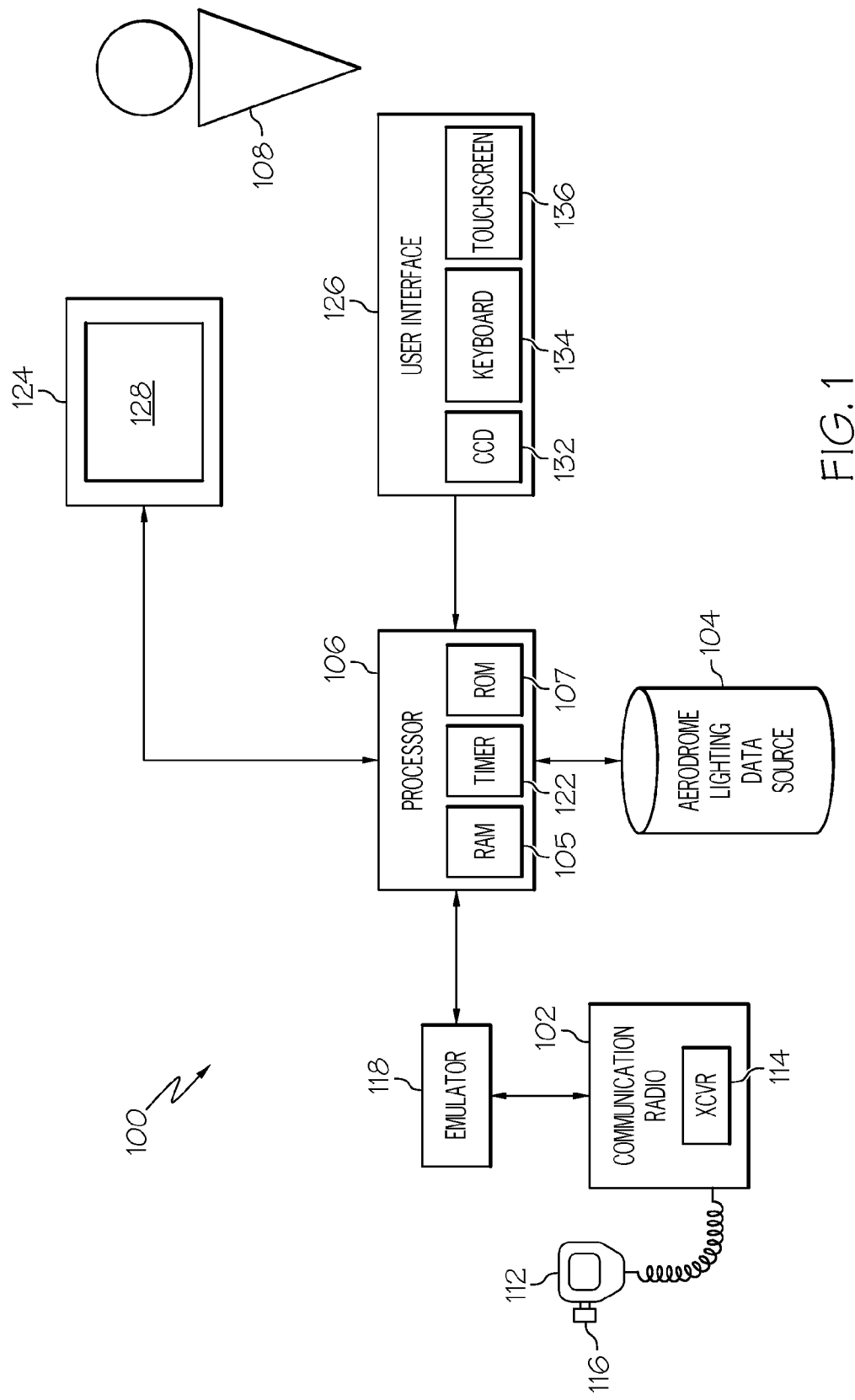
FIG. 1 depicts a functional block diagram of one exemplary embodiment of an automated aerodrome lighting control system.

Referring now to FIG. 1, a functional block diagram of one exemplary embodiment of an automated aerodrome lighting control system 100 is depicted, and includes a communication radio 102, an aerodrome lighting data source 104, and a processor 106. The communication radio 102, which may be variously configured and implemented, is used to selectively transmit and receive radio frequency (RF) signals, to allow communications between an aircraft pilot 108 and various external entities, such as air traffic controllers and pilots of other aircraft. To do so, the communication radio 102 includes a radio microphone 112 and a transceiver 114. The radio microphone 112 includes a transmit switch 116 that, when pressed by a user (e.g., the pilot 108), configures the radio microphone 112 to convert audible sounds to electrical signals in the audio frequency range. The transceiver 114 receives the audio frequency signals from the radio microphone 112, modulates an RF carrier signal with the audio frequency signals, and transmits the modulated RF signal.

The aerodrome lighting data source 104 is configured to at least selectively supply aerodrome lighting data. As used herein, aerodrome lighting data are data representative of light control characteristics of aerodrome lighting associated with individual aerodromes. The specific content of the aerodrome lighting data may vary, but typically includes at least the type of PCL system that is installed (e.g., type J or type K) and the transmission frequency at which the aerodrome lighting may be energized and controlled. It will be appreciated that although the aerodrome lighting data source 104 is, for clarity and convenience, depicted as being implemented in a storage structure that is separate from the processor 102, all or portions of the aerodrome lighting data source 104 could be loaded into, or integrally formed as part of, the processor 106. The aerodrome lighting data source 104 could also be part of a device or system that is physically separate from the automated aerodrome lighting control system 100.

The processor 106 may be any one of numerous known general-purpose microprocessors or an application specific processor that operates in response to program instructions. In the depicted embodiment, the processor 106 includes on-board RAM (random access memory) 105, and on-board ROM (read only memory) 107. The program instructions that control the processor 106 may be stored in either or both the RAM 105 and the ROM 107. For example, the operating system software may be stored in the ROM 107, whereas various operating mode software routines and various operational parameters may be stored in the RAM 105. It will be appreciated that this is merely exemplary of one scheme for storing operating system software and software routines, and that various other storage schemes may be implemented. It will also be appreciated that the processor 106 may be implemented using various other circuits, not just a programmable processor. For example, digital logic circuits and analog signal processing circuits could also be used.

No matter how the processor 106 is specifically implemented, it is in operable communication with the communication radio 102 and the aerodrome lighting data source 104. The processor 106 is configured to selectively retrieve, from the aerodrome lighting data source 104, aerodrome lighting data associated with one or more individual aerodromes. The processor 106 is additionally configured to selectively command the communication radio 102 to transmit RF signals consistent with the light control characteristics associated with the individual aerodrome. As will be discussed further below, in some embodiments the processor 106 may be configured to command the communication radio 102 to transmit the RF signals in response to an input to the system 100 from, for example, the pilot 108. As will also be discussed further below, in other embodiments the processor 106 may be configured to automatically command the communication radio 102 to transmit the RF signals with no input to the system 100 from the pilot 108. For example, the processor 106 may automatically command the communication radio 102 to transmit the RF signals in response to one or more events. Before discussing these various embodiments, some additional features of the depicted system 100 will be described.

As is generally known, when the transmit switch 116 on the radio microphone 112 is operated or "keyed," a microphone "click" signal is momentarily generated. This microphone click signal is also in the audio frequency range, and modulates the RF carrier signal. Thus, the depicted system 100 additionally includes an emulator 118. The emulator 118 is in operable communication with the communication radio 102. The emulator 118 is configured, in response to an emulator command, to generate an emulated microphone click signal and supply the emulated signal to the communication radio 102. In the communication radio 102, the emulated microphone click signal modulates the RF carrier signal, which is then transmitted. The emulator 118 is also in operable communication with, and receives the emulator command from, the processor 106. Thus, as may be appreciated, the processor 106 is additionally configured to supply the emulator command. It is noted that for clarity and ease of description and illustration, the emulator 118 is depicted as being separate from the communication radio 102 and the processor 106. It will be appreciated, however, that in some embodiments the emulator 118 may be implemented in the processor 106, or in the communication radio 102, or partially in both.

As is generally known, whenever PCL controlled aerodrome lighting is energized, a countdown commences, and when the countdown is completed, the aerodrome lighting is automatically deenergized. Typically, this countdown is about 15-minutes long. Thus, the system 100 may also include a timer 122 to ensure that the system 100 is at least substantially synced with the PCL countdown. It will be appreciated that the processor 106 is additionally configured to start the timer 122 and, using the timer 122, to determine when a predetermined time period has lapsed. The predetermined time period may vary, and may be a fixed, preset time period, or a user-selectable time period. In any case, the predetermined time period is preferably less than 15-minutes. As will be discussed further below, when the predetermined time period has lapsed, the processor 106 may command the communication radio 102 to retransmit the appropriate RF signals. In the depicted embodiment, the timer 122 is implemented in the processor 106. It will be appreciated, however, that in other embodiments the timer 122 could be implemented as a separate entity or as part of another system, circuit, or device.

The depicted system 100 additionally includes a display device 124 and a user interface 126, which are both in operable communication with the processor 106. The display device 124 includes a display 128, and is configured to receive image rendering display commands from the processor 106. The display device 124 is responsive to the image rendering display commands to render one or more images on the display 128, and thereby supplies visual feedback to the pilot 108. The specific types of images that the display device 124 is commanded to render on the display 128 will be described in more detail further below, and may vary depending, for example, on how the display device 124 is configured. In this regard, it will be appreciated that the display device 124 may be configured as any one (or more) of numerous types of aircraft flight deck display devices that may implement the functionality described herein. For example, the display device 124 may be configured as a multi-function display, a primary flight display, a horizontal situation indicator, a vertical situation indicator, or a navigation display, just to name a few. The display device 124 may additionally be implemented as a panel mounted display device, a HUD (head-up display) projection display device, various portable and/or hand-held display devices, or any one of numerous known technologies. It is furthermore noted that the display 128 may be implemented using any one of numerous known displays suitable for rendering textual, graphic, and/or iconic information in a format viewable by the pilot 108. Non-limiting examples of such displays include various cathode ray tube (CRT) displays, and various flat panel displays such as various types of LCD (liquid crystal display), various types of LED (light emitting diode), touchscreen, and TFT (thin film transistor) displays.

The user interface 126 configured to receive input from the pilot 108 and, in response to user input, supply command signals to the processor 106. The user interface 126 may include any one of, or combination of, various known user interface devices including, but not limited to, a cursor control device (CCD), such as a mouse, a trackball, or joystick, and/or a keyboard, one or more buttons, switches, or knobs. In the depicted embodiment, the user interface 126 includes a CCD 132, a keyboard 134, and a touchscreen 136. The pilot 108 uses the CCD 132 to, for example, move a cursor symbol that may be rendered on the display 128, uses the keyboard 134 to, for example, input textual data, and uses the touchscreen to, for example, implement either or both of these functions.

Figure 2:
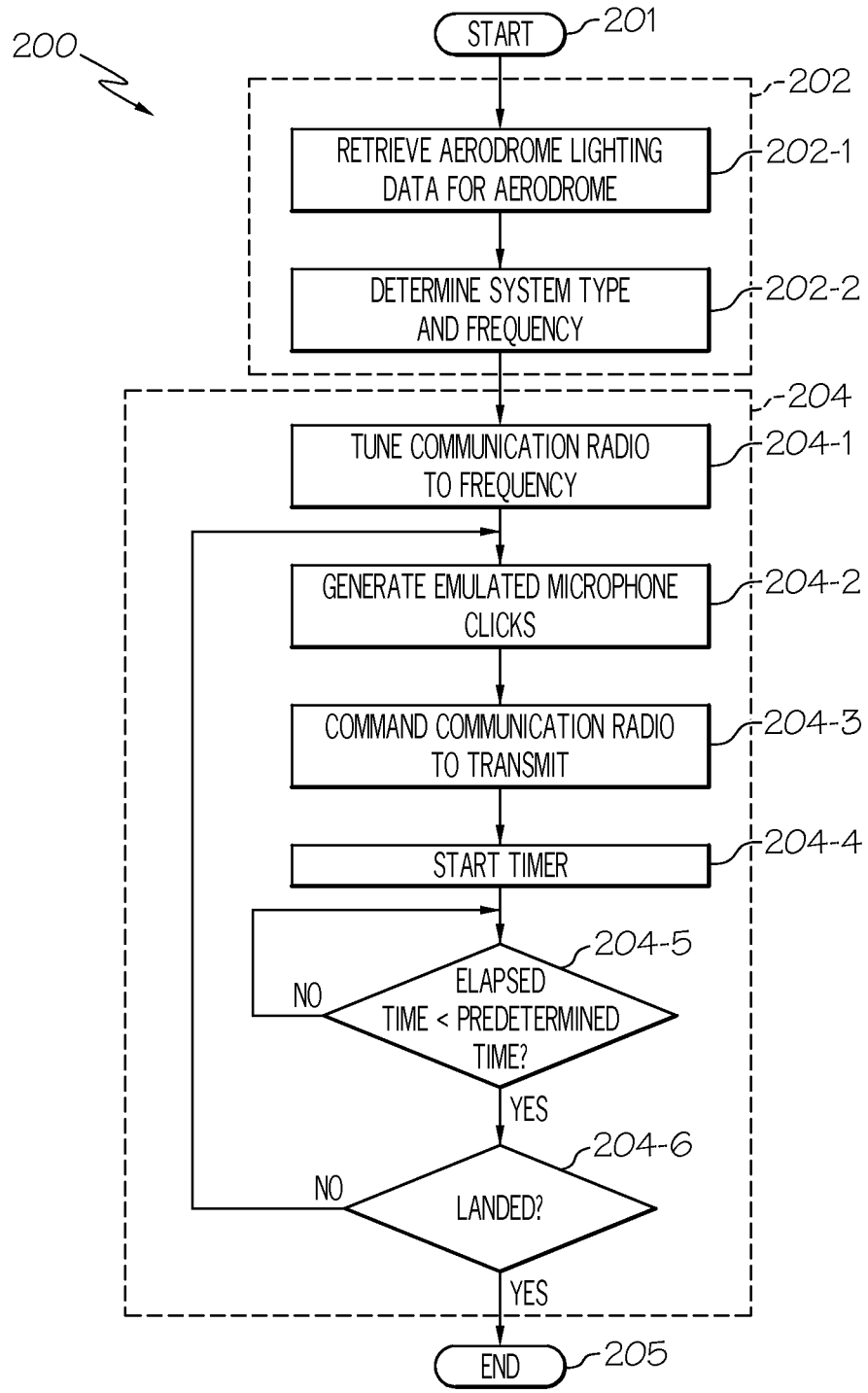
FIG. 2 depicts an embodiment of a general process, in flowchart form, that the system of FIG. 1 may implement.

Having described the overall configuration of the automated aerodrome lighting control system 100, various embodiments of processes that the system 100 may be configured to implement will be described. In doing so, reference should first be made to FIG. 2, which depicts an embodiment of the general process 200, in flowchart form, that the system 100 is configured to implement. As may be seen, the process 200 includes the processor 106 retrieving aerodrome lighting data from the aerodrome lighting data source 104 (202). More specifically, the processor 106 selectively retrieves aerodrome lighting data associated with an individual aerodrome (202-1) and, upon retrieval of the data, determines the type of PCL system (e.g., type J or type K) installed at the aerodrome and the operational frequency of the PCL system (202-2).

Before describing the general process 200 further, it is noted that the particular aerodrome lighting data that the processor 106 retrieves may be selected prior to take-off, while the pilot is creating the flight plan, or it may be selected while the aircraft is in flight. For example, and with reference to FIG. 3, the processor 106 may be configured to command the display device 124 to render one or more interactive fields on the display 128 (or any one of numerous other non-illustrated displays) while creating the flight plan. When creating a flight plan for the aircraft, the pilot selects, among other things, a destination airport 302. If, as in the depicted case, the selected destination airport 302 includes PCL controlled lighting, a first one of the interactive fields 304 is used to selectively enable or disable automatic operation of the system 100. As may be appreciated, selecting "YES" (or any one of numerous other suitable terms that may be rendered) in this interactive field 304 will enable automatic operation, whereas selecting "NO" (or any one of numerous other suitable terms that may be rendered) will disable automatic operation.

Figure 4:
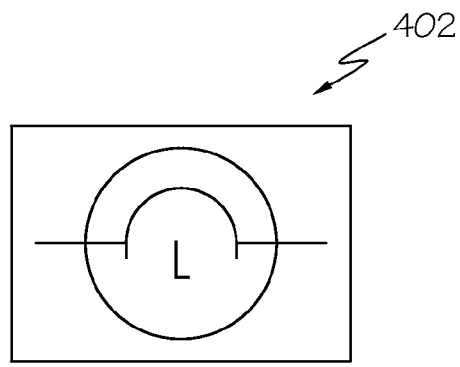
FIG. 4 depicts an embodiment of an indicator that the system of FIG. 1 may cause to be rendered on one or more display devices while implementing the process of FIG. 2.

In some embodiments, the system 100 may also be configured to render an indicator on one or more display devices to indicate that the system 100 is set for automatic operation. The display device on which this indicator is rendered may vary, and may be display device 124 and/or one or more other suitable display devices. It will additionally be appreciated that the configuration of the indicator may vary. One exemplary configuration is depicted in FIG. 4. As will be described further below, one or more visual characteristics of the indicator 402 may vary after the specific aerodrome lighting is energized.

Returning once again to FIG. 3, a second interactive field 306 that may be rendered during the flight planning stage is one that may be used to select the desired intensity of the aerodrome lighting at the destination airport 302. In particular, the intensity of the aerodrome lighting in type K PCL systems may, once energized, be turned to low, medium, or high intensity settings. Thus, if the retrieved aerodrome light data indicates that the PCL system at the destination airport 302 is a type K system, the processor 106 will command the display device 124 to render the second interactive field 306 on the display, allowing the pilot 108 to select a "LOW," "MEDIUM," or "HIGH" intensity setting. If the retrieved aerodrome light data indicates that the PCL system at the destination airport 302 is a type J system, the processor 106 either may not command the display device 124 to render the second interactive field 306, or it may command the display device 124 to render this field 306 in a "grayed out," or otherwise non-interactive, manner.

If the system 100 is configured to enable automatic operation (e.g., "ON" is selected in the first interactive field 304), then the processor 106 will automatically command the communication radio 102 to transmit RF signals, as will be described further below, in response to an event. The basis of the particular event may vary, but two exemplary bases include time and range. More specifically, a time-based event may be when the aircraft's estimated time of arrival (ETA) to the destination airport 302 reaches a predetermined time, and a range-based event may be whenever the aircraft is within a predetermined range of the destination airport 302. If the system 100 is configured to implement these event-based automatic initiation features then, as FIG. 3 further depicts, the processor 106 may command the display device 124 to render a third interactive field 308, which allows the pilot 108 to select either a "RANGE" based event or a "TIME" based event. Though not depicted in FIG. 3, if the pilot selects "RANGE" (or any one of numerous other suitable terms that may be rendered) in the third interactive field 308, a dialog box may pop up in which a desired range value may be entered. Similarly, if the pilot selects "TIME" (or any one of numerous other suitable terms that may be rendered) in the third interactive field 308, a dialog box may pop up in which a desired time value may be entered.

Figure 3:
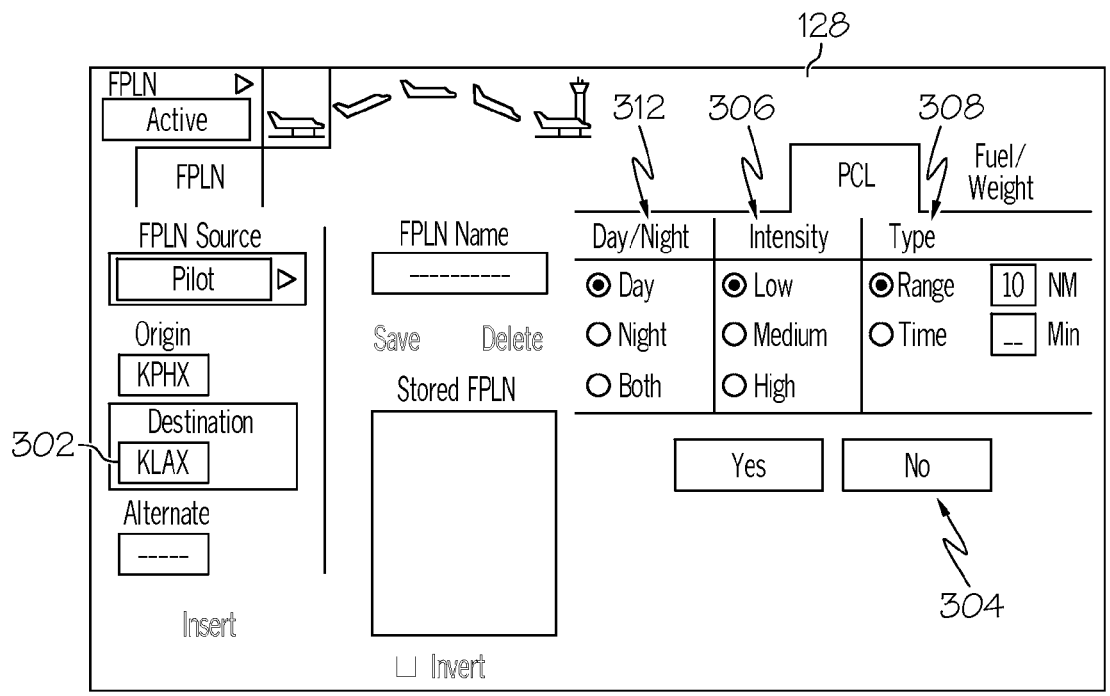
FIG. 3 depicts a simplified representation of an image that may be displayed by the system of FIG. 1 while implementing the process of FIG. 2.

In some embodiments, such as the one depicted in FIG. 3, a fourth interactive field 312 may also be rendered. The fourth interactive field 312, if included, will prevent the unwanted energizing of aerodrome lighting during the day or night. More specifically, if the system 100 is configured to enable automatic operation (e.g., "ON" is selected in the first interactive field 304), the fourth interactive field allows the pilot to select aerodrome lighting activation during the day (e.g., sunrise to sunset), during the night (e.g., sunset to sunrise), or both.

Figure 5:
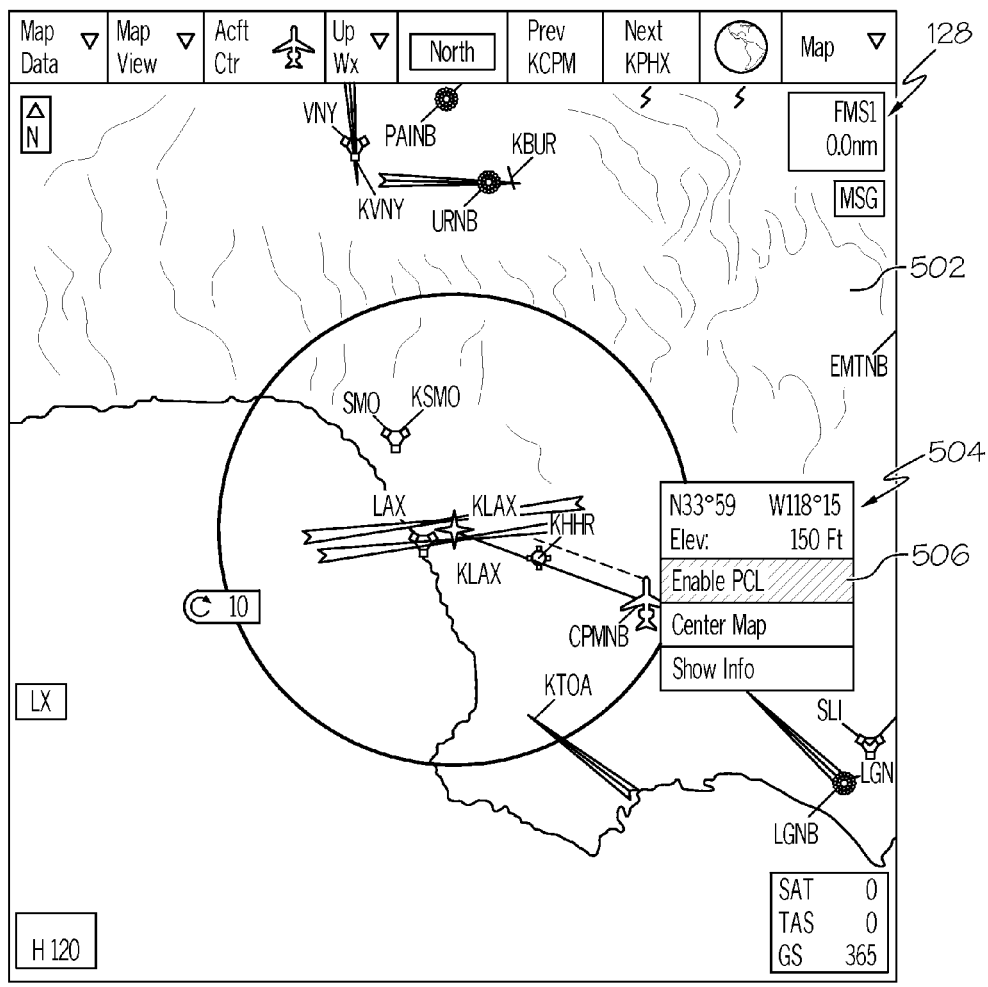
FIGS. 5-12 each depict embodiments of exemplary images that may be displayed by the system of FIG. 1 while implementing the process of FIG. 2.

If, after selecting the destination airport, the pilot 108 selects "NO" in the first interactive field 304, then, as noted, the automatic initiation operation is disabled. However, the system 100 is additionally configured to allow the pilot 108 to selectively enable PCL lighting while the aircraft is in flight. For example, and with reference now to FIG. 5, the system 100 may be configured to allow the pilot 108 to select (or otherwise input) a particular latitude and longitude position on a lateral map 502 (or other rendered image) that may be rendered on the display 128 of display device 124 (or any one of numerous other non-illustrated displays). When selected (or inputted) using, for example, the user interface 126, the processor 106 will first determine if the latitude/longitude position is within a predetermined range of the destination airport. If the latitude/longitude position is within the predetermined range, then the processor 106 will command the display device 124 to render a task menu 504 on the display 128. The task menu 504 may include various selectable options (only 3 shown in FIG. 5), but will include at least an "Enable PCL" (or other suitable terminology) option 506. If the pilot 108 selects the "Enable PCL" option 706, then the processor 106 will automatically command the communication radio 102 to transmit RF signals, as will be described further below. It should be noted that if the selected latitude/longitude position is not within the predetermined range, then the task menu 504 will not be rendered at all, or it may be rendered without the "Enable PCL" option 506, or it may be rendered with the "Enable PCL" option 506 in a "grayed out" or other interactive manner so that it is non-selectable. It will be appreciated that the predetermined range may vary.

Figure 6:
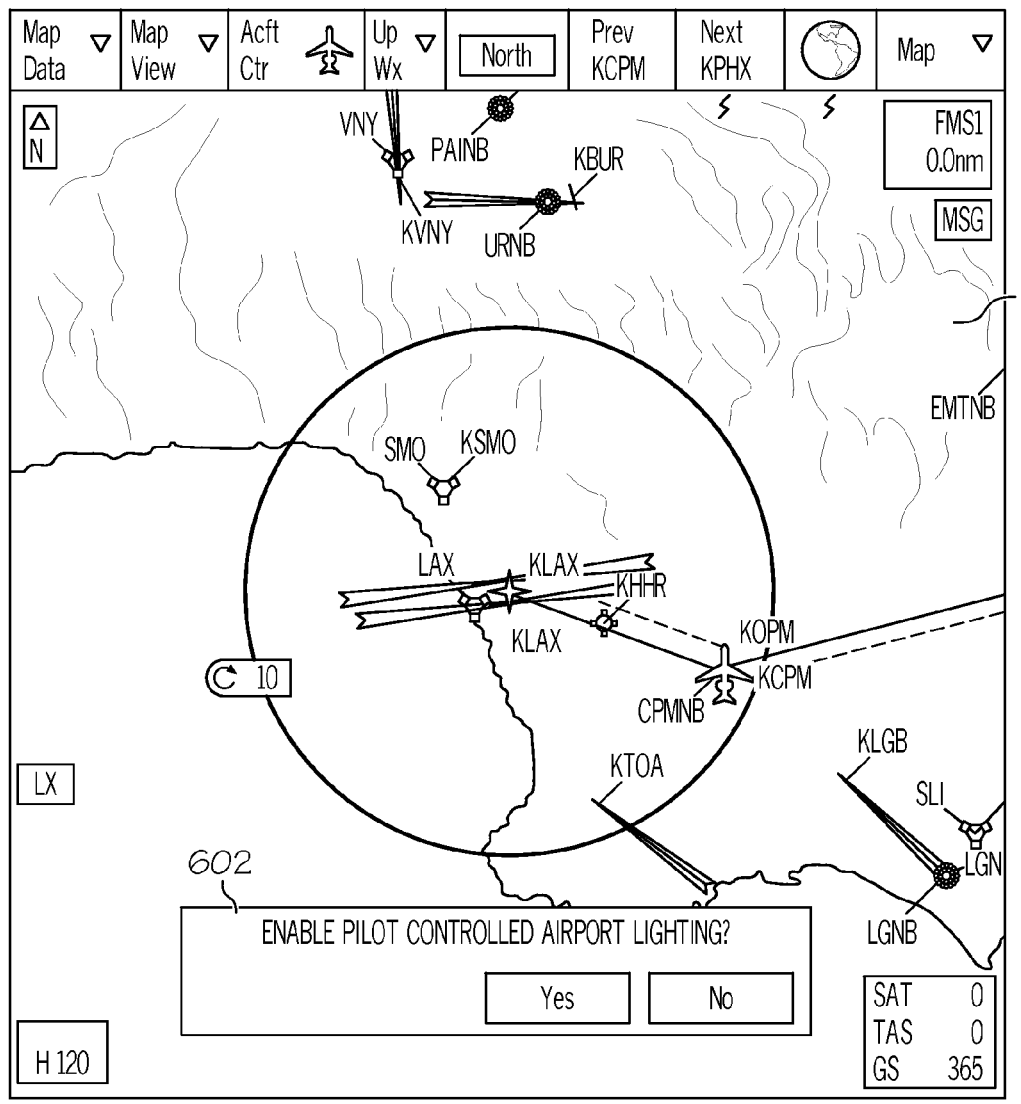

Another manner in which the system 100 may allow the pilot 108 to selectively enable PCL lighting while the aircraft is in flight is to automatically trigger the rendering of a dialog box (or other suitable interactive field). More specifically, if the processor 106 determines that the aircraft is within a predetermined range or ETA of the destination airport, it will command the display device 124 to render, on the display 128, a pop-up dialog box. The specific configuration of the rendered dialog box may vary, but one exemplary dialog box 602 that is depicted FIG. 6 merely asks whether the pilot would like to "Enable pilot controlled airport lighting?", and allows the pilot 108 to select either "Yes" or "No." Alternatively, the system 100 could be configured to determine whenever the aircraft is within a predetermined range or ETA of an airport. Upon being within the predetermined range/ETA of an airport, the processor 106 will then determine if the airport has associated aerodrome lighting data in the airport lighting data source 104. If so, the processor 106 will retrieve the associated aerodrome lighting data therefrom, and command the display device 124 to render the dialog box 602.

Figure 7:
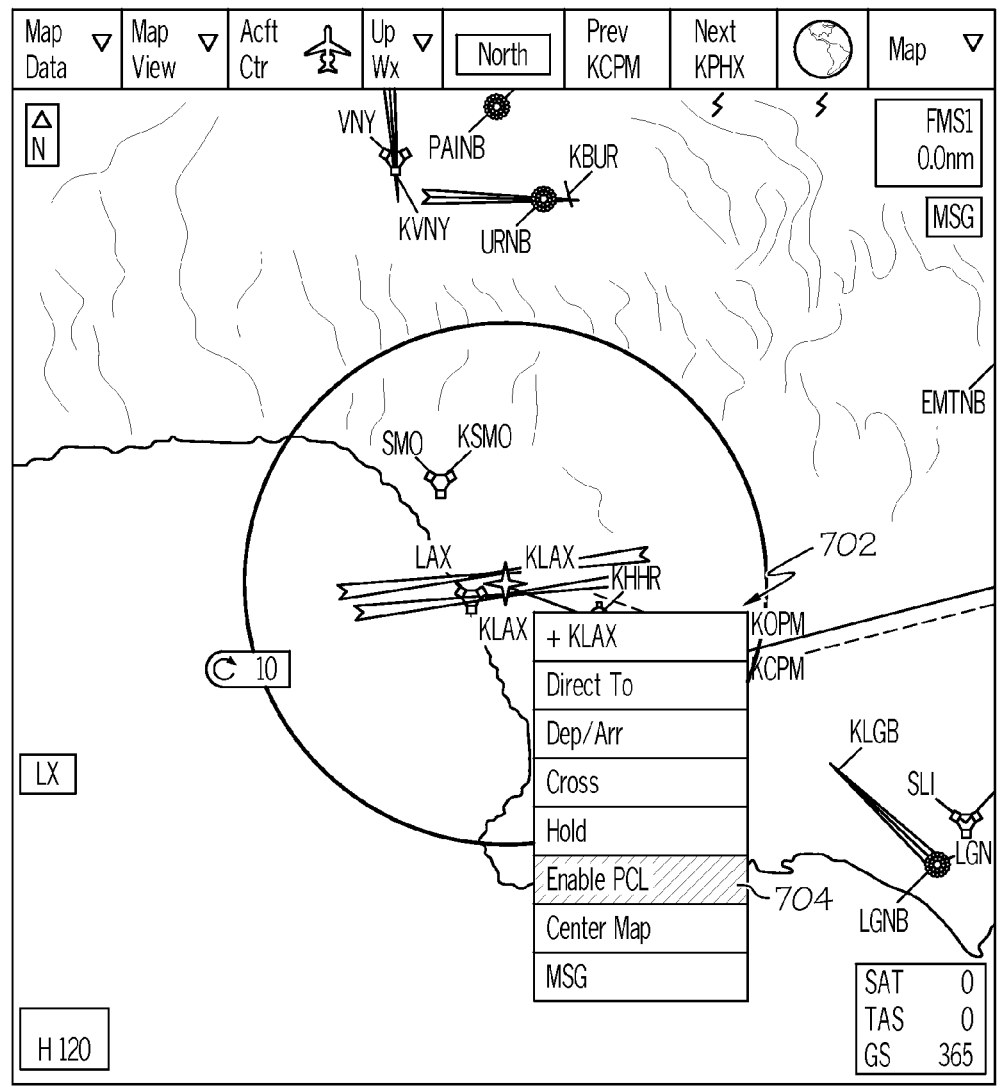

With the exception of the alternative embodiment just mentioned, the process 200 has been disclosed in the context of aerodrome lighting data being retrieved during the flight planning stage. If, however, aerodrome lighting data are not retrieved by the processor 106 during the flight planning stage, these data may be retrieved during an in-flight phase. For example, while the aircraft is in flight, the pilot 108 may select a particular airport or waypoint using, for example, a cursor and the CCD 132. As depicted in FIG. 7, upon selecting the airport or waypoint (the airport KLAX selected in FIG. 7), the processor 106 will retrieve the appropriate aerodrome light data from the aerodrome lighting data source 104, and command the display device 124 to render a task menu 702 on the display 128. The task menu 702 may include various selectable options (only 7 shown in FIG. 7), but will include at least an "Enable PCL" (or other suitable terminology) option 704. If the pilot 108 selects the "Enable PCL" option 704, then the processor 106 will command the display device 124 to render, on the display 128, an interactive field, which may be similar to the one described above and depicted in FIG. 3, but which will allow the pilot 108 to select either a "RANGE" based event, a "TIME" based event, or a "REGION" based event.

As described previously, if the pilot 108 selects "RANGE" (or any one of numerous other suitable terms that may be rendered) in the interactive field, a non-illustrated dialog box may pop up in which a desired range value may be entered. After the desired range value is entered, the processor 106 will automatically command the communication radio 102 to transmit the RF signals, as will be described further below, when the aircraft reaches the desired range value. Similarly, if the pilot 108 selects "TIME" (or any one of numerous other suitable terms that may be rendered) in the interactive field, a non-illustrated dialog box may pop up in which a desired time value may be entered. After the desired time value is entered, the processor 106 will automatically command the communication radio 102 to transmit RF signals, as will be described further below, when the ETA of the aircraft reaches the desired time value.

Figure 8:
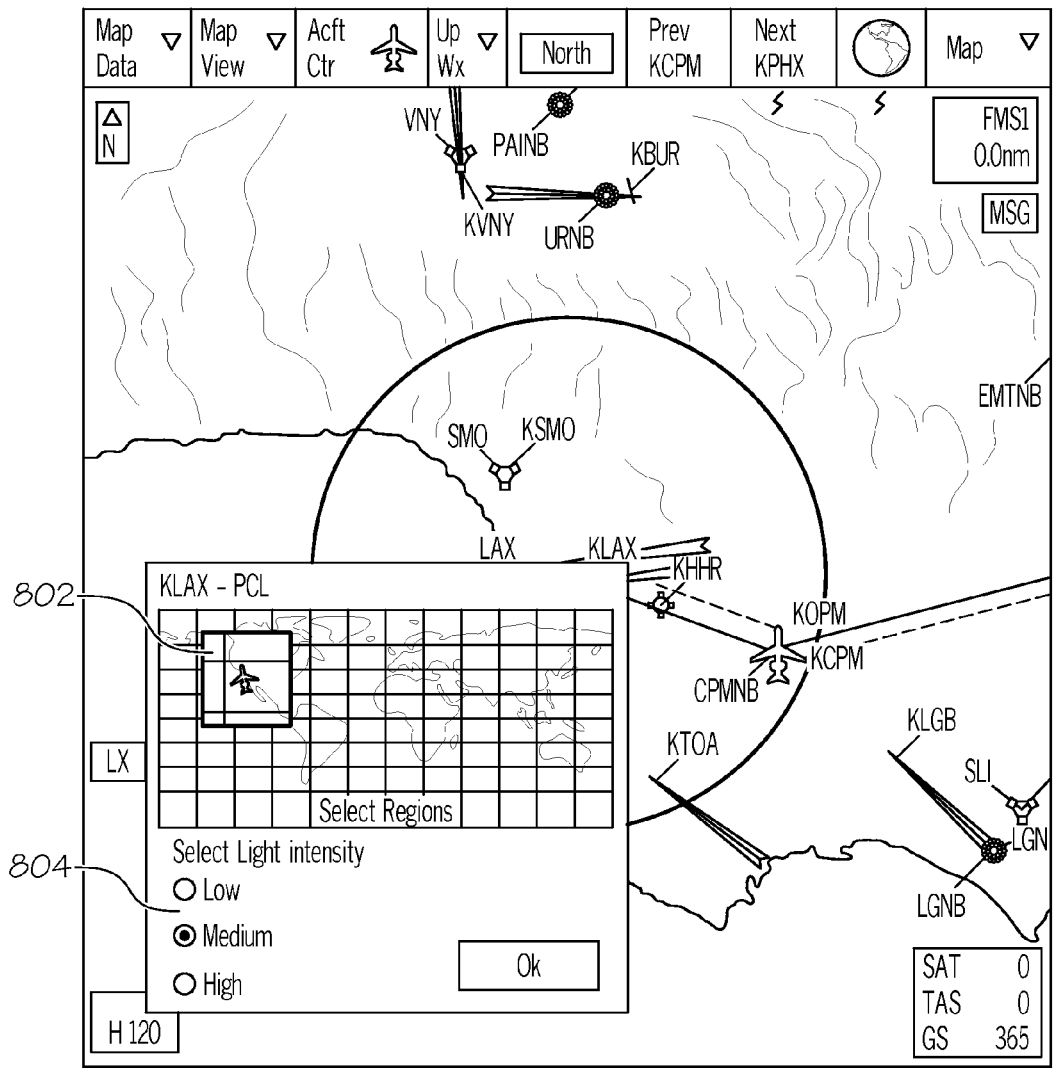

If the pilot 108 selects "REGION" (or any one of numerous other suitable terms that may be rendered) in the interactive field, the processor 106 will, as depicted in FIG. 8, command the display device 124 to render a plurality of selectable tiles 802 around the selected airport. As is generally known, a 50 nautical mile (nm) by 50 nm area around an airport is divided into 1 nm by 1 nm airspace regions. Thus, each selectable tile 802 in FIG. 8 represents a 1 nm by 1 nm airspace region within that 50 nm by 50 nm area. After the pilot 108 selects one or more of these tiles 802, the processor 106 will automatically command the communication radio 102 to transmit RF signals, as will described further below, whenever the aircraft is in the airspace regions represented by the selected tiles 802. As FIG. 8 also depicts, if the PCL system is a type K system, the processor 106 may also command the display device 124 to render an interactive field 804, similar to the second interactive field 306 depicted in FIG. 3, to allow the pilot 108 to select a "LOW," "MEDIUM," or "HIGH" intensity setting.

Returning now to FIG. 2, the remainder of the general process 200 will now be described. After the aerodrome data are retrieved, the PCL system type and frequency are determined, and PCL lighting is enabled (either automatically or in response to user input), the processor 106 commands the communication radio 102 to transmit RF signals consistent with the light control characteristics associated with the individual aerodrome (204). More specifically, the processor 106 first commands the communication radio 102 to tune to the determined operational frequency of the PCL system (204-1). Thereafter, the processor 106 commands the emulator 118 to generate the correct number of emulated microphone click signals, based on the determined PCL system type (204-2). As noted above, the emulated microphone click signals are received by the communication radio 102 and modulate the RF carrier signal. The processor 106, at least substantially simultaneously with commanding the emulator 118, commands the communication radio 102 to transmit the RF signals (204-3).

Figure 9:
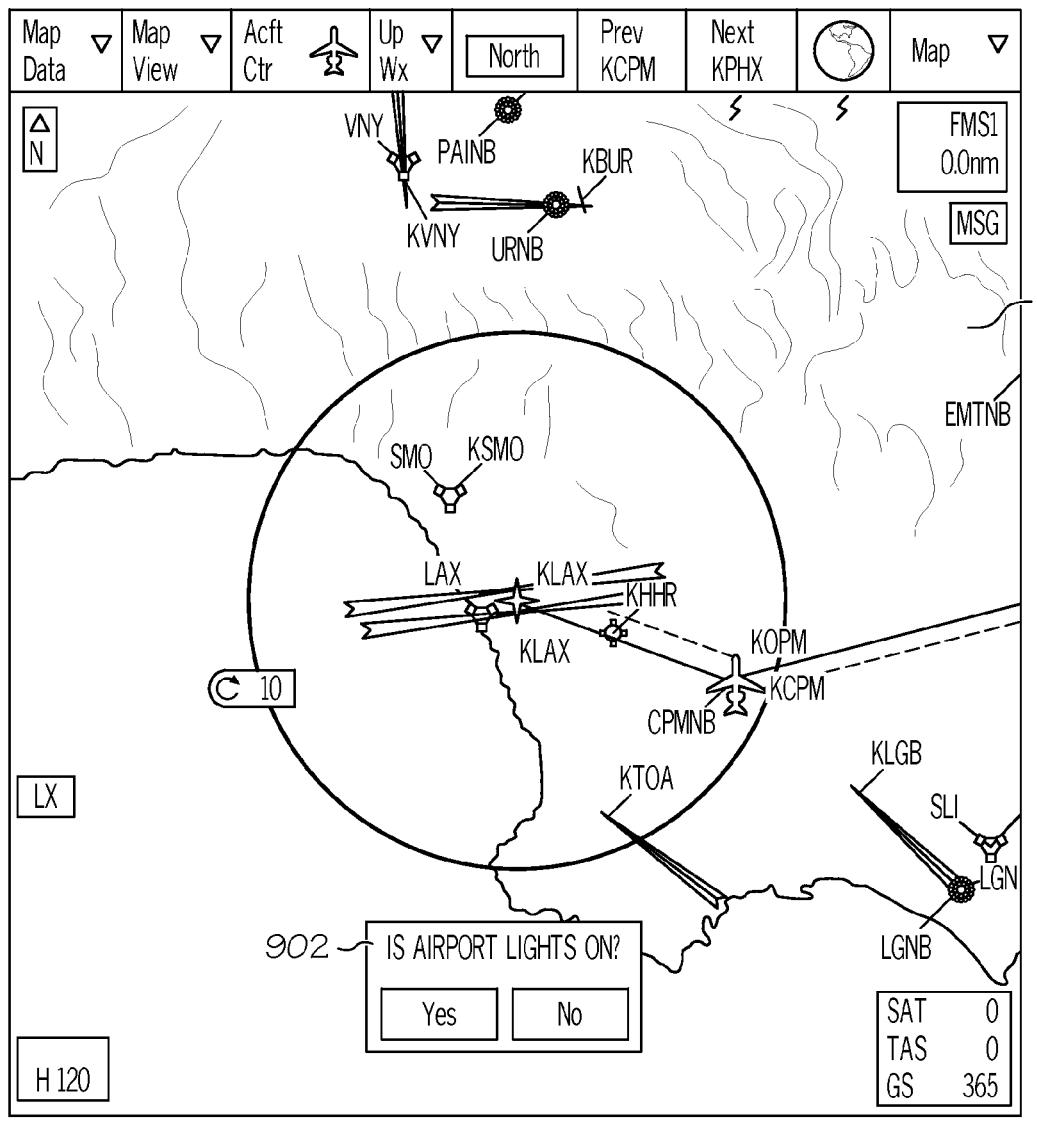

In some embodiments, after the communication radio 102 transmits the RF signals, the processor 106 will also command the display device 124 to render, on the display 128, a feedback dialog box. The feedback dialog box 902, an embodiment of which is depicted in FIG. 9, is rendered on the display to query the pilot 108 as to whether the aerodrome lighting is indeed energized. If the answer is "YES" (or any one of numerous other suitable terms that may be rendered), then the processor 106 no longer commands the display device 124 to render the dialog box 902. If, however, the answer is "NO" (or any one of numerous other suitable terms that may be rendered), then the processor 106 may be configured to command the display device 124 to render additional information on the display 128. The particular information may vary, but may preferably include a message to contact the flight service station (FSS) at the airport to request assistance. The message may additionally include the appropriate radio communication frequency to use.

Before proceeding further, it is noted that some aircraft are equipped with infrared cameras (or other form of thermal imaging) and a synthetic vision system (SVS). For these aircraft, instead of rendering the dialogue box 902 described above, an automated method of feedback can be generated. With this method, the processor 106 is configured to command an appropriate display device (either display device 124 or other display device) to render a fused image of the SVS over a thermal image. The detection of a high luminance area around the specific aerodrome can be considered confirmation that the aerodrome lighting is energized.

Returning once again to the process 200, if the aerodrome lighting is confirmed to be energized, the processor 106 will then start the timer 122 (204-4). It should be noted that in those embodiments that are not configured to render the confirmation dialogue box 902, the processor 106 may start the timer 122 after, or at least commensurate with, commanding the communication radio 102 to transmit. In either case, the processor 106 then determines, using the timer 122, when the predetermined time period has lapsed (204-5). Upon the predetermined time period lapsing, the processor determines whether the aircraft has landed (204-6). If the aircraft has not landed, then the processor 106 again commands the emulator 118 to generate the correct number of emulated microphone click signals (204-2) and the communication radio 102 to transmit the communication radio 102 to transmit (204-3). If, on the other hand, the aircraft has landed, the processor 106 will not command the communication radio 102 to retransmit the RF signals. Thus, the aerodrome lighting will be allowed to extinguish when the 15-minute countdown has lapsed.

It was previously noted that in some embodiments, the system 100 may also be configured to render the exemplary indicator 402 depicted in FIG. 4 on one or more display devices. It was also noted that one or more visual characteristics of the indicator 402 may vary after the specific aerodrome lighting is energized. In some embodiments, the visual characteristic is color, though other visual characteristics, such as brightness or transparency, could also be used. For those embodiments in which the visual characteristic is color, the indicator 402, or at least a portion of the indicator, may be rendered in a second color (e.g., green) whenever the aerodrome lighting is confirmed to be energized. Thereafter, the indicator 402, or at least a portion of the indicator, may be rendered in a third color (e.g., red) whenever the aerodrome lighting is about to be extinguished. The indicator 402, or at least a portion of the indicator, may be rendered in a fourth color (e.g., yellow) whenever the aerodrome lighting is extinguished.

Figure 10:
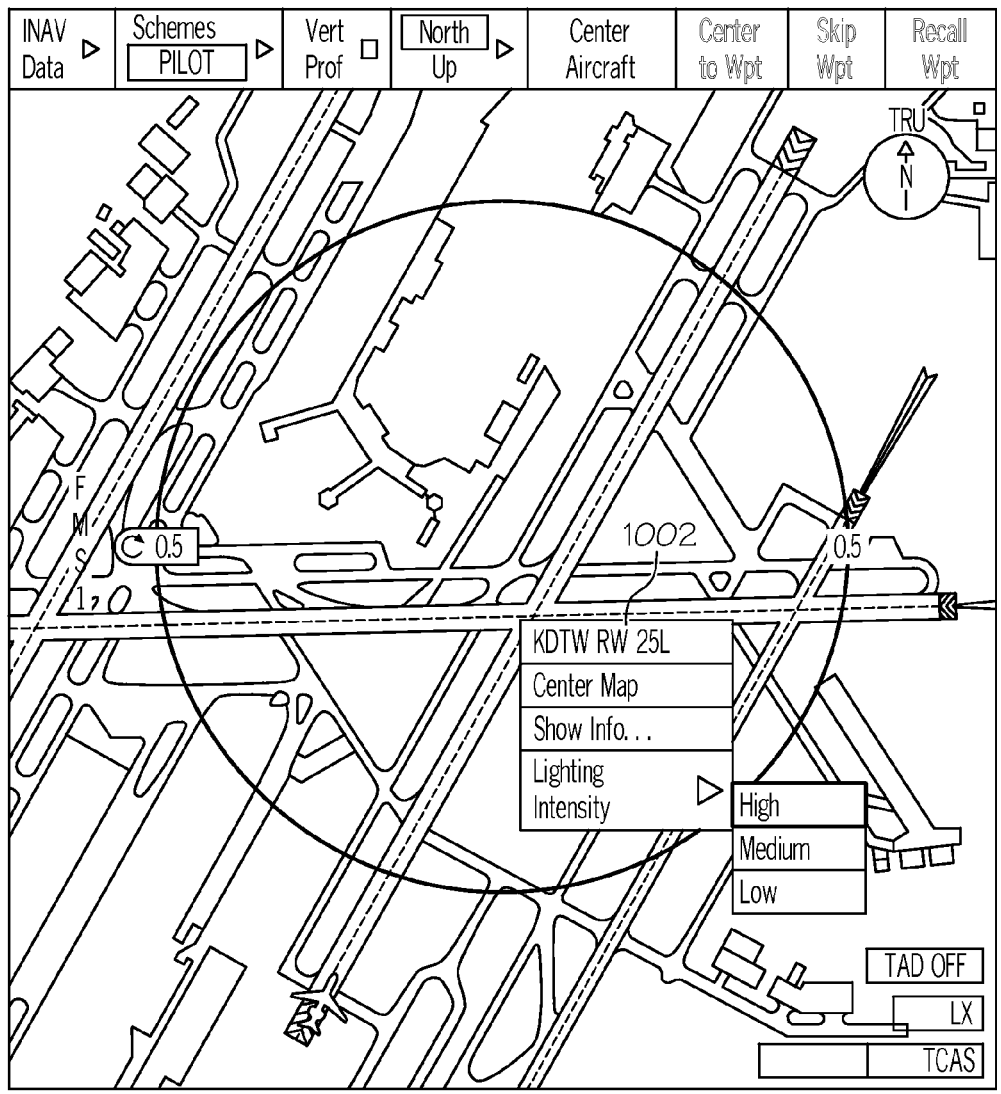

It will be appreciated that in some embodiments, after the communication radio 102 transmits the RF signals, and the aerodrome lighting is energized, the processor 106 may also, at least selectively, command the display device 124 to render lighting intensity control selections and/or lighting status information on the display 128. For example, as depicted in FIG. 10, after the aerodrome lighting is energized, the processor 106 may command the display device 124 to render a task menu 1002 on the display 128 to enable the pilot 108 to selectively change the intensity of type K aerodrome lighting. It will be appreciated that the task menu 1002 is preferably rendered in response to an input by the pilot 108 using the user interface 126. It will additionally be appreciated that the intensity control may be rendered using an icon or other widget, if the display 128 is a touchscreen type of display.

Figure 11:
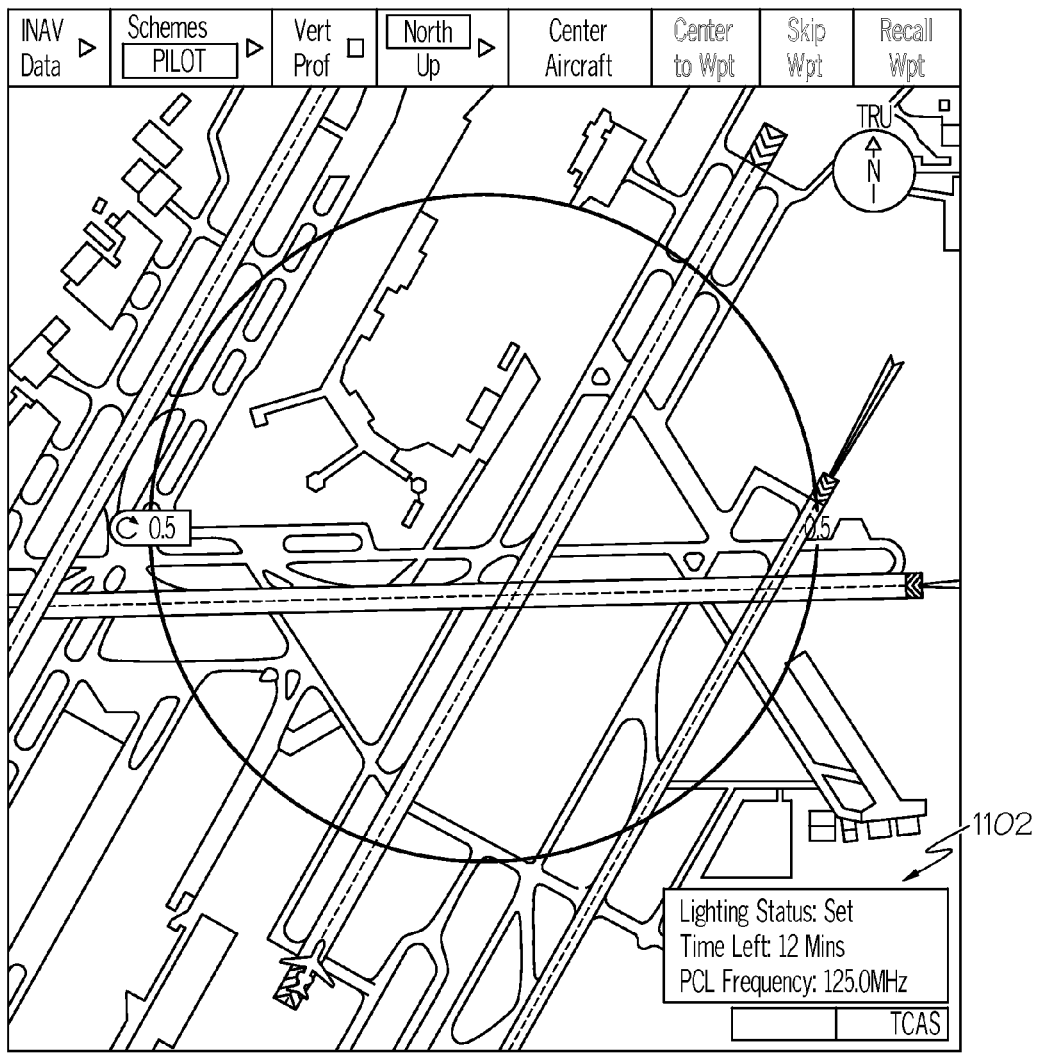

With reference to FIG. 11, the processor 106 may also command the display device 126 to render status information 1100 on the display 128. The status information may vary, but in the depicted embodiment includes whether or not the aerodrome lighting is energized 1102, the amount of time left on the 15-minute timer 1104, and the PCL frequency 1106.

Figure 12:
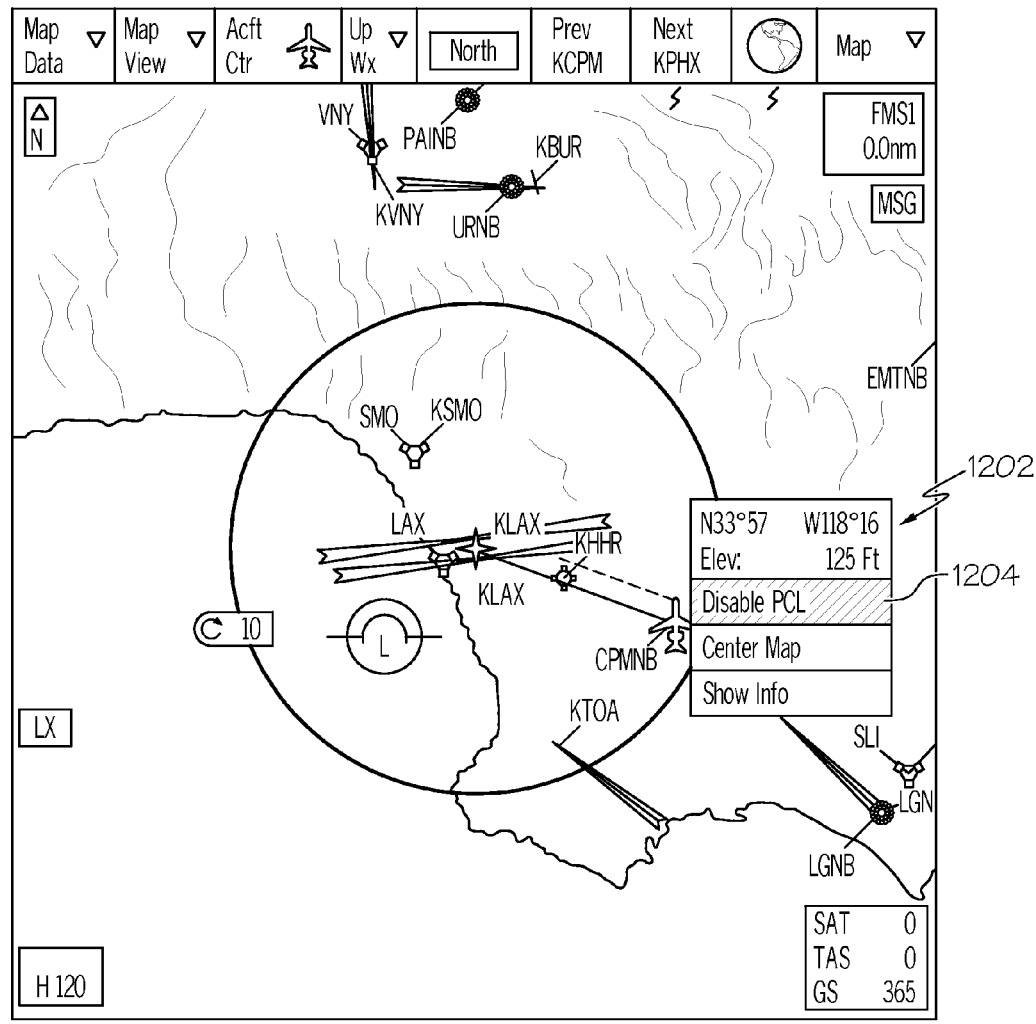

Finally, and as FIG. 12 depicts, the system 100 may also be configured, at least in some embodiments, to disable PCL lighting after it has been enabled. In particular, the processor 106 may be configured to selectively render a task menu 1202 on the display 128. The task menu 1202 will include at least a "Disable PCL" (or other suitable terminology) option 1204. If the pilot 108 selects the "Disable PCL" option 1204, then the processor 106 will disable automatic operation of the system 100.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An automated aerodrome lighting control system, comprising:
    a communication radio configured to selectively transmit radio frequency (RF) signals;
    an aerodrome lighting data source configured to at least selectively supply aerodrome lighting data representative of light control characteristics of aerodrome lighting associated with individual aerodromes;
    a processor in operable communication with the aerodrome lighting data source and the communication radio, the processor configured to:
        selectively retrieve, from the aerodrome lighting data source, aerodrome lighting data associated with an individual aerodrome, and
        selectively command the communication radio to transmit RF signals consistent with the light control characteristics associated with the individual aerodrome.

2. The system of claim 1, further comprising:
    an emulator in operable communication with the processor and the communication radio, the emulator configured to generate an emulated audio frequency signal and supply the emulated audio frequency signal to the communication radio.

3. The system of claim 2, wherein:
    the processor is further configured to supply an emulator command to the emulator; and
    the emulator is responsive to the emulator command to generate the emulated audio frequency.

4. The system of claim 3, wherein:
    the communication radio includes a user-operated radio microphone, the radio microphone having a transmit switch that, when operated, at least generates a microphone click signal; and
    the emulated audio signal is an emulated microphone click signal.

5. The system of claim 1, wherein the processor is further configured to command the communication radio to retransmit the RF signals consistent with the light control characteristics associated with the individual aerodrome when a predetermined time period has lapsed.

6. The system of claim 5, wherein:
    the system is at least partially disposed within an aircraft;
    the processor is adapted to receive a signal indicating that the aircraft has landed; and
    the processor is further configured to command the communication radio to retransmit the RF signals consistent with the light control characteristics associated with the individual aerodrome when (i) the predetermined time period has lapsed and (ii) the processor receives the signal indicating that aircraft has landed.

7. The system of claim 5, wherein the processor is further configured to:
    start a timer at least commensurate with commanding the communication radio; and
    determine when the predetermined time period has lapsed using the timer.

8. The system of claim 1, wherein the light control characteristics include a transmission frequency and a lighting system type.

9. The system of claim 1, further comprising:
    a display device having a display, the display device configured to receive image rendering display commands and configured, upon receipt thereof, to selectively render one or more images on the display,
    wherein the processor is in operable communication with the display device and is further configured to selectively supply image rendering display commands to the display device that cause the display device to render, on the display, information associated with controllable aerodrome lighting.

10. The system of claim 9, wherein the display device comprises a touchscreen display.

11. The system of claim 10, wherein the information associated with controllable aerodrome lighting comprises a user interface that includes selectable options associated with the controllable aerodrome lighting.

12. The system of claim 11, wherein the options associated with the controllable aerodrome lighting include relative light intensity.

13. The system of claim 11, wherein the options associated with the controllable aerodrome lighting include a dialog box that queries an operator as to whether the controllable aerodrome lighting is illuminated.

14. The system of claim 13, wherein the information associated with controllable aerodrome lighting comprises aerodrome lighting status information.

15. The system of claim 14, wherein the aerodrome lighting status information includes one or more of:
   an indication that the radio was commanded to transmit the RF signals;
   time remaining before the controllable aerodrome lighting will automatically extinguish; and
   a frequency at which the radio transmitted the RF signals.

16. The system of claim 9, wherein the processor is further configured to selectively supply image rendering display commands to the display device that causes the display device to render, on the display, a user interface that includes one or more interactive fields to selectively activate the processor to, and inactivate the processor from, at least commanding the communication radio to transmit RF signals.

17. The system of claim 9, wherein:
   the processor is further adapted to receive flight plan data, the flight plan data including at least data representative of a destination airport having an aerodrome on which to land an aircraft; and
   the processor is further configured to automatically command the communication radio to transmit the RF signals consistent with the light control characteristics associated with the aerodrome on which the aircraft may land when at least one predetermined criterion is met.

18. The system of claim 17, wherein the at least one predetermined criterion includes one of:
   the aircraft being within a selected range of the destination airport;
   the aircraft being within a selected amount of time before reaching the destination airport; and
   the aircraft being within a selected airspace region.

19. The system of claim 9, wherein:
   the processor is further adapted to receive flight plan data, the flight plan data including at least data representative of a destination airport having an aerodrome on which to land an aircraft; and
   the processor is further configured to command the display device to render, on the display, a user interface when at least one predetermined criterion is met, the user interface including one or more interactive fields to selectively activate the processor to, and inactivate the processor from, at least commanding the communication radio to transmit the RF signals consistent with the light control characteristics associated with the aerodrome on which the aircraft may land.

20. The system of claim 19, wherein the at least one predetermined criterion includes one of:
   the aircraft being within a selected range of the destination airport;
   the aircraft being within a selected amount of time before reaching the destination airport; and
   the aircraft being within a selected airspace region.

* * * * *